C. O. THOMAS, Jr.
FIELD KITCHEN.
APPLICATION FILED NOV. 8, 1916.
1,238,216.
Patented Aug. 28, 1917.
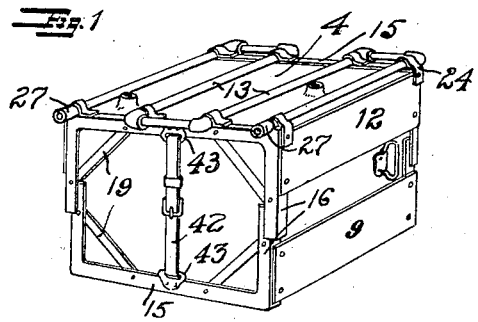
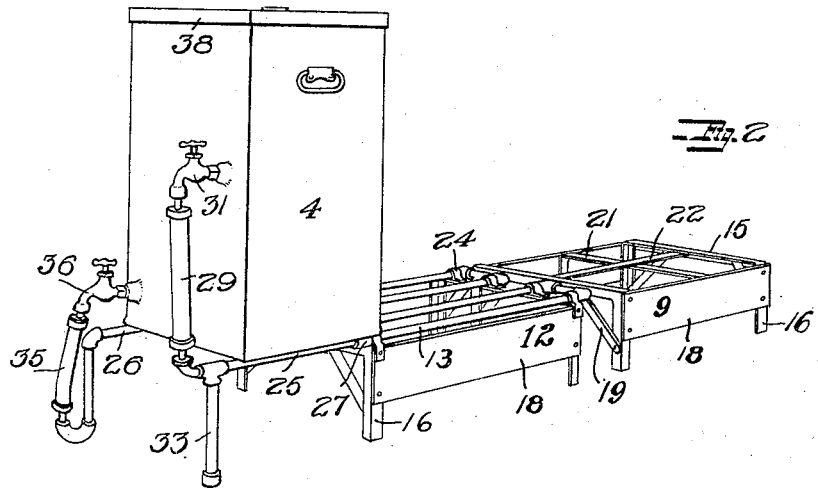
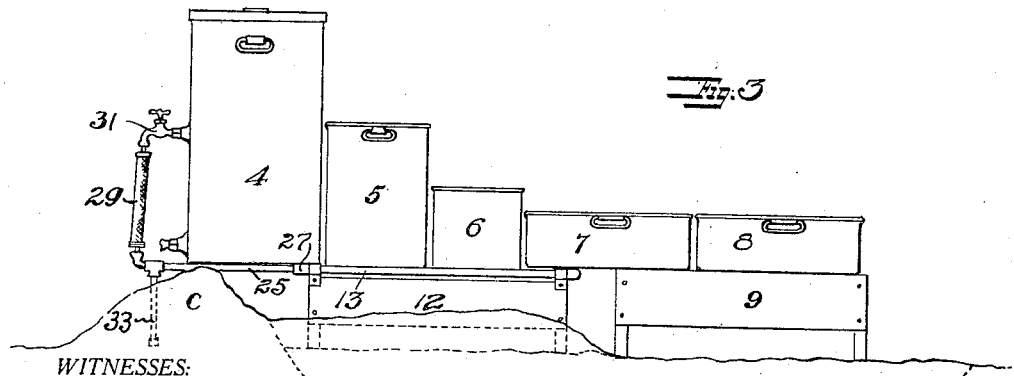
WITNESSES:
INVENTOR
C. O. THOMAS, JR.
BY
his ATTORNEYS

UNITED STATES PATENT OFFICE.

CHARLES O. THOMAS, JR., OF PRESIDIO, MONTEREY, CALIFORNIA.

FIELD-KITCHEN.

1,238,216.      Specification of Letters Patent.      Patented Aug. 28, 1917.

Application filed November 8, 1916. Serial No. 130,115.

*To all whom it may concern:*

Be it known that I, CHARLES O. THOMAS, Jr., a citizen of the United States, and an officer in the United States Army, now stationed at the Presidio of Monterey, county of Monterey, State of California, have invented a new and useful Field-Kitchen, of which the following is a specification.

My invention relates to portable kitchen outfits for use by an army or other body of men in the field.

An object of my invention is to provide a kitchen outfit for a large body of men which can be condensed into a relatively small space for purposes of transport.

Another object of my invention is to provide portable means for securing quantities of hot water.

Another object of my invention is to provide a portable kitchen outfit comprising a full complement of cooking utensils, a tank, and grids on which to hold the utensils, one of said grids including a heating coil whereby the fire under the cooking utensils also serves to heat a supply of water in the tank.

Another object of the invention is to provide a portable outfit of the character described in which the cooking utensils nest together into the tank and the grids serve to secure the nested utensils therein and as a protective crate to the whole when packed for transport.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a perspective view of the complete outfit of my invention packed ready for transportation.

Fig. 2 is a perspective view of the grids and tank of the outfit when set up ready for field use. The cooking utensils are omitted.

Fig. 3 is an elevation of the complete outfit when set up ready for field use.

The proper cleansing of cooking utensils and dishes after use is recognized as a factor of great importance in preserving the health of a body of men in the field and it is therefore one of the objects of the present invention to provide means whereby an abundance of hot water is secured while the meal is being prepared.

Obviously the requirements of field service and transportation preclude all stationary devices for the purpose and effect rigid limitations as to the bulk, weight and method of operation. My complete outfit includes an assortment of knives, spoons, meat saws, ladles and other needful small implements for use in preparing and cooking food, and also includes a pipe wrench which is required in taking down and assembling the large units of the outfit.

The outfit proper consists of a tank 4, a large boiler 5, a small boiler 6, roasting pans 7 and 8, grids 9 and 12, the heating coil 13, and certain fittings which are needed when the tank and heating coil are connected. The boilers and roasting pans are of such size and proportion that they nest together and all slip into the tank, the small fittings and small utensils being packed in the interior of the boilers or other vacant space. Preferably I arrange the small boiler 6 to nest in the large boiler 5. The large boiler 5, together with the various fittings and small implements therein, is adapted to be inclosed by the two roasting pans which then slip down into the tank.

The grids 9 and 12 are constructed to form a support for the various vessels and the tank so that a fire may be built thereunder. Fig. 3 shows the grids resting on the ground and the tank and cooking vessels arranged thereon. Preferably the grids are straddled over a shallow trench the bottom of which is indicated by the dotted line B. This trench is to provide additional fire space and to facilitate the placing of fuel under the grids. Preferably the grids consist of end pieces 15 of angle iron turned at the ends to provide legs 16 for supporting the grid and its load upon the ground. Side pieces 18 of thin metal connect the end pieces and the legs are further stiffened by the braces 19. Cross pieces 21 and 22 on the surface of the grid 9 help to stiffen the frame of the grid and also serve as grate bars upon which the cooking vessels rest. The grids are made of such a size that one may be placed on each side of the tank, the legs of one nesting within the legs of the other as shown in Fig. 1.

Secured to the grid 12 by the straps 24 or other appropriate means is the heating coil 13. Preferably I place the coil on the surface of the grid so that the pipe becomes the grate bars on which the cooking utensils rest when the outfit is set up as shown in Fig. 3. In order to keep the surface of the grids exclusively for cooking, means are provided for supporting the tank 4 at one end of the grid and for this purpose extension pieces or pipes 25 and 26 are provided. Both extension pieces are releasably coupled to the coil by the sleeves 27 so that they may be removed therefrom when the outfit is to be packed up. When connected with the coil they form part of the conductors connecting the coil with the tank. The outer end of the pipe 25 is turned upward and connects with a flexible conductor 29 which in turn is releasably coupled to a faucet or valve 31, detachably secured in the side of the tank about half way between the top and bottom. A leg 33 supports the outer end of the pipe 25. The pipe 26 is turned downwardly to form a leg and at the bottom is connected with a flexible conductor 35 which is releasably coupled to the valve or faucet 36 detachably secured in the side of the tank near the bottom.

From the above it will be clear that when the tank and coil are arranged as shown in Fig. 2, the valves opened and the tank filled, a fire under the coils will cause a circulation therethrough from the tank and a consequent heating of the water. The tank is provided with a cover 38 to prevent unnecessary heat losses and contamination of the contents. When the water is hot the valve 31 is closed and the conductor 35 uncoupled, when the hot water may be drawn off as needed through the valve 36.

When the outfit is assembled, dirt is thrown up around the outer end of the tank as shown at C, Fig. 3. This is to protect the flexible conductors 29 and 35 from the action of the flames. The dirt is also banked along the outer edge of the grid 12 as shown in Fig. 3 to better preserve the fire thereunder.

In taking down the outfit for purposes of transport, the flexible connections 29 and 35 are uncoupled from the valves and the tank drained. The valves 31 and 36 are then unscrewed from their sockets in the tank and the pipes 25 and 26 unscrewed from the ends of the heating coil. These small fittings and connections together with the cooking implements are packed in the boilers as already explained. The boiler 5 is then placed in the roasting pans and all slipped into the tank and the cover placed thereon. The grids are next assembled, one on each side of the tank and secured in place thereon by means of straps 42 passed through suitable eyes 43 secured on each end of the grids.

Fig. 1 shows the outfit so packed ready for transportation and it will be noted that the grids completely inclose and protect the tank.

It will be obvious from the above that if desired, both grids may be provided with a coil, but it has been found in practice that one is sufficient.

I claim:

1. A field outfit comprising a grid adapted to be used over an open fire, a heating coil arranged on said grid, a tank coupled to said coil, adjacent one end of the grid, and side pieces on said grid for preventing a lateral spreading of the fire and for directing the flames toward the tank.

2. A field outfit comprising a grid, a coil of pipe arranged on said grid, extension pieces adapted to be releasably coupled to said coil, and a tank connected to said extension pieces and adapted to be supported thereby.

3. A field outfit comprising a coil of pipe, extension pieces adapted to be releasably coupled to said coil, means for supporting the extension pieces and the coil, and a tank adapted to be supported on said extension pieces and connected therethrough with said coil.

4. A field outfit comprising a pair of similarly formed grids adapted to be nested together, a heating coil arranged upon one of said grids, and a tank adapted to be releasably coupled to said coil and adapted to be inclosed by said nested grids.

5. A field outfit comprising a pair of grids having legs adapted to slip one within the other, a heating coil arranged upon one of said grids, a tank adapted to be releasably coupled to said coil and adapted to be inclosed by said nested grids, and means for securing said grids about said tank.

6. A field outfit comprising a grid, a coil of pipe arranged on said grid, extension pieces adapted to be releasably coupled to said coil, a tank adapted to be supported on said extension pieces and flexible conductors connected to said extension pieces and releasably coupled to said tank.

7. A field outfit comprising a grid, a heating coil forming the cooking surface of said grid, extension pieces adapted to be releasably coupled to said coil, and a tank supported on said extension pieces and connecting therethrough to said coil.

In testimony whereof, I have hereunto set my hand at San Francisco, California, this 21st day of October, 1916.

CHARLES O. THOMAS, Jr.

Copies of this patent may be obtained for five cents each, by addressing the "Commissioner of Patents, Washington, D. C."